July 18, 1939.   K. W. JARVIS   2,166,298
METHOD AND APPARATUS FOR RADIO RECEPTION
Filed Nov. 11, 1933   7 Sheets-Sheet 1

INVENTOR
Kenneth W. Jarvis
BY Evans + McCoy
ATTORNEYS

July 18, 1939.  K. W. JARVIS  2,166,298
METHOD AND APPARATUS FOR RADIO RECEPTION
Filed Nov. 11, 1933  7 Sheets-Sheet 2

INVENTOR
Kenneth W. Jarvis
BY
ATTORNEYS

July 18, 1939.    K. W. JARVIS    2,166,298
METHOD AND APPARATUS FOR RADIO RECEPTION
Filed Nov. 11, 1933    7 Sheets-Sheet 3

INVENTOR
Kenneth W. Jarvis
BY
ATTORNEYS

July 18, 1939.  K. W. JARVIS  2,166,298
METHOD AND APPARATUS FOR RADIO RECEPTION
Filed Nov. 11, 1933  7 Sheets-Sheet 7

INVENTOR
Kenneth W. Jarvis
BY
ATTORNEYS

Patented July 18, 1939

2,166,298

UNITED STATES PATENT OFFICE 2,166,298

METHOD AND APPARATUS FOR RADIO RECEPTION

Kenneth W. Jarvis, Chicago, Ill.

Application November 11, 1933, Serial No. 697,592

36 Claims. (Cl. 250—20)

This invention relates to radio receiving sets and more specifically to detecting systems for use therewith. This constitutes in part a continuation of my co-pending application, Serial No. 592,764, filed February 13, 1932, now Patent No. 2,115,813, utilizing certain of the principles laid down in that application but being primarily directed towards improvements in reception rather than in quiet set operation between stations, as was the case with that application.

The objects of the invention are the provision of methods and apparatus by which substantial reduction or elimination of certain defects in reception inseparable with present day receivers may be made. These objects include the provision of methods and apparatus for rendering satisfactory the reception of modulated signals in which the percentage of modulation is greater than 100 per cent. Subsidiary to this object is the necessary object of providing a detector which can be sensitive to phase reversal in the modulated carrier or the reduction of the percentage of modulation to a degree where it can be handled by a normal detector.

A further object is the provision of a local oscillator capable of being operated on the carrier frequency and capable of following within limits the variations in the carrier frequency.

Further objects are the reduction of linear and square law detector distortions, increase in station sensitivity, and the decrease of frequency modulation distortion. The result of the achievement of these objects is the provision of methods and apparatus whereby broadcasting stations may be operated at substantially higher percentages of modulation than is now possible and with the resulting increase in station service area and decrease in station interference.

A further object is the prevention of receiver noise between stations which would otherwise be encountered in the operation of my system.

Further objects will be apparent to those skilled in the arts.

Referring now to the figures, Fig. 1 is a diagram of a modulated and unmodulated signal.

Before describing the system of my invention an understanding of and comparison with present detecting systems is desirable.

As is well known the wave of a carrier modulated to a single audio frequency may be analyzed into the original carrier of constant amplitude plus two side band frequencies of equal and constant amplitude but differing in frequency from the carrier frequency by the frequency of modulation above and below. The ratio of the sum of amplitudes of the side band frequencies to the amplitude of the unmodulated carrier times one hundred is known as the percentage of modulation.

Increasing the audio frequency amplitude will increase the percentage of modulation. Physically this results in increasing the amplitude of the side bands, while the carrier remains practically constant.

As the two side bands are equal in amplitude, the instantaneous maximum or minimum is the amplitude of the carrier plus or minus twice the amplitude of one side band. If each side band has half the amplitude of the carrier, their sum added to the carrier will, at some time, reach an instantaneous amplitude twice that of the carrier, and a short time later, when the sum of the side bands subtract from the carrier, the result is an instantaneous amplitude of zero.

Figure 1:
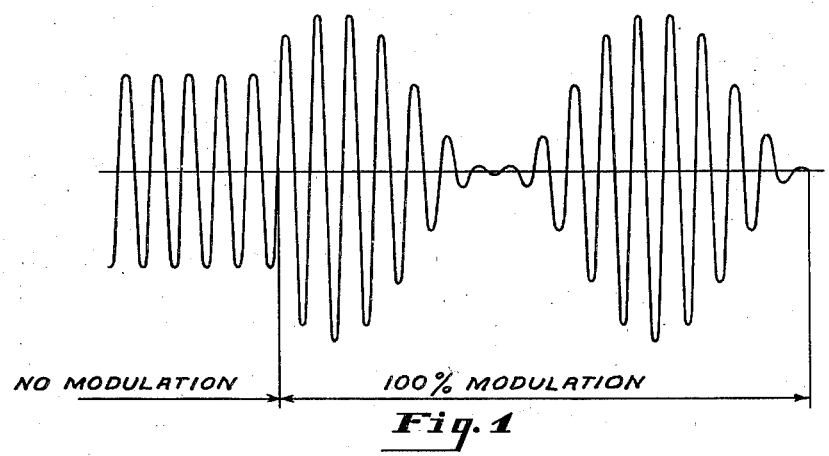

This condition, wherein the carrier varies between zero amplitude and twice the amplitude of the unmodulated carrier, is called "100% modulation". This condition is shown in Figure 1, where may be seen the amplitude of the carrier before modulation, and with 100% modulation. Lesser degrees of modulation give a similar envelope curve shape but not reaching the same maximum or minimum amplitude.

Figure 2:
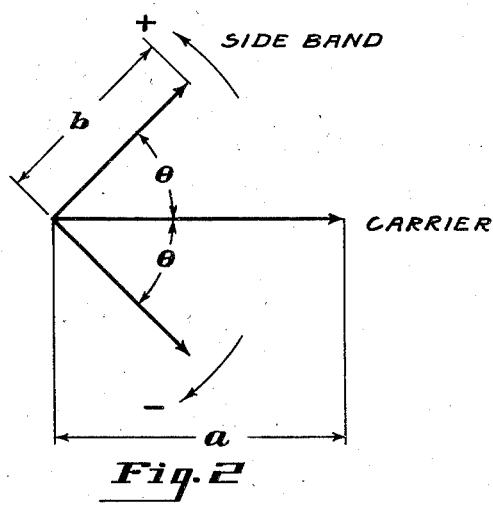
Fig. 2 is a vector diagram of the time relationship of the carrier and side band amplitude vectors in a modulated signal.

Fig. 2 shows the time relationships in the form of a vector diagram of these frequencies with constant amplitude of carrier and side band frequencies, the carrier vector being held stationary, the side band vectors rotating at equal angular velocities, plus and minus. It is easily seen that the resultant of the side band vectors is a vector in the direction of the carrier vector which is according to the position of rotation of the side band vectors added to or subtracted from the carrier vector.

Figure 3:
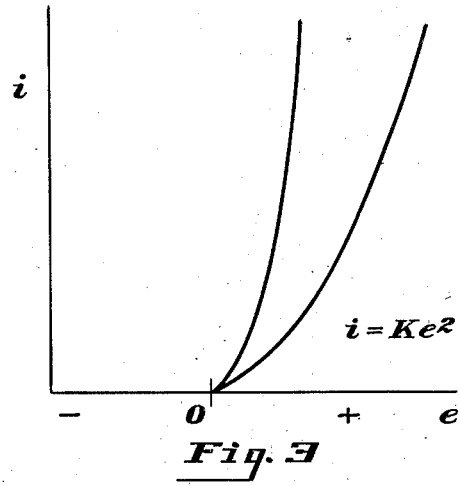
Fig. 3 is a diagram of operation of the "square law" detector.
Figure 4:
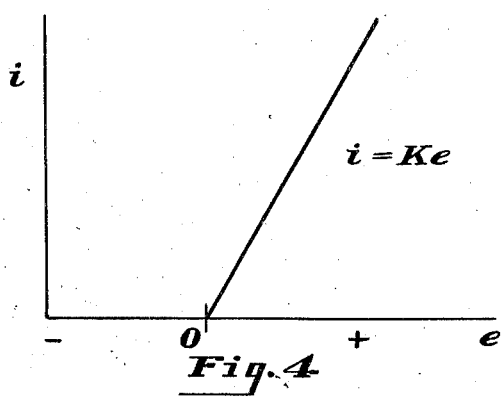
Fig. 4 is a diagram representing the operation of a "linear" detector.

Detectors having characteristics intermediate or approaching two extremes are possible in radio receivers. One extreme is the square law detector, such as indicated in Figure 3, and the other is the linear detector, as indicated in Figure 4. For the purpose of this discussion it may be assumed that Figure 4 is the type of detector characteristic to be considered. The same results will be obtained if Figure 3, or any intermediate curve, be used.

Figure 5:
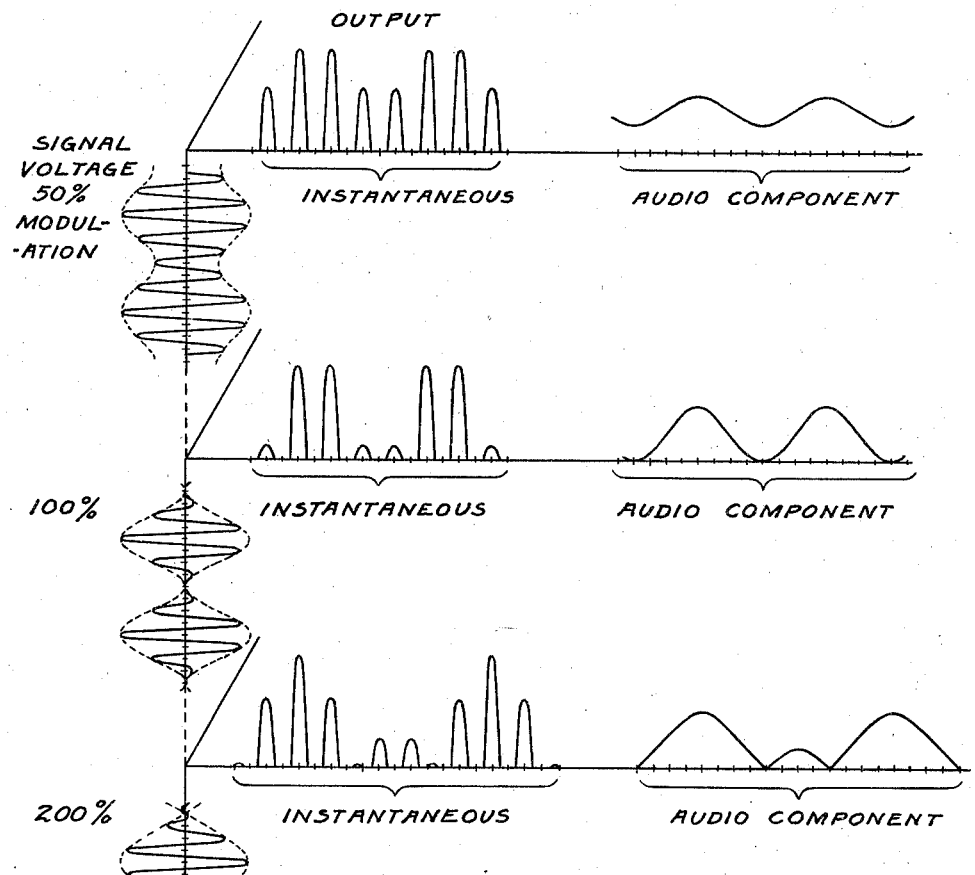
Fig. 5 is a diagram of the operation of a linear detector in detecting signals of various degrees of modulation.
Figure 6:
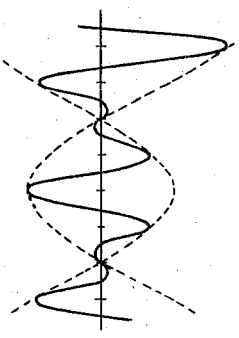
Fig. 6 is an enlarged portion of the signal wave with 200% modulation shown in Fig. 5 at the point where the envelope curves overlap, showing the reversal of phase of the carrier.

The action of such a type detector in demodulating a signal such as shown in Figure 1 is shown in Figures 5 and 6, for three percentages of modulation. The first is for 50%, the second 100% and the third 200%. This 200% modulation may come somewhat as a surprise if 100% has been considered the limit previously by the reader. In the case of 50% modulation, it may be seen that a sine wave audio component results. This is also true in the case of the 100% modulation. However, in the case of the 200% modulation it will be observed that due to the crossing of the envelope of the applied RF signal to the detector, that an audio note having a reversed loop in it is the result. This audio component is no longer sine wave, and can be analyzed into a number of frequency components indicating a great deal of distortion.

Of course, the first and obvious answer is to prevent the transmitter from modulating more than 100%, so as to avoid the distortion resulting from such a condition. This is substantially done at present in most transmitters, although in order to raise the distance of transmission, most stations are attempting to maintain as high a percentage of modulation as possible. This means that sometimes, with very loud signals in the studio, they modulate more than 100% and so give great distortion.

It is also true that, for a number of reasons, the practical handling limit in an average good detector is between 85% and 90%, so that even the ideal of 100% cannot be obtained. A major defect, however, lies in a peculiar condition which takes place between the transmitter and the receiver. Fading is a common property of radio transmission on distant stations. A detailed analysis of fading was made some years ago and it was discovered that the individual side band frequencies did not fade alike, and that two frequencies quite close together might be entirely different in their fading characteristics. That is, when one was normal, the other might have faded to a very low value. The result of this spasmodic fading is to change the quality of the received music to some extent, as some notes which should be present may be omitted because of this so called "selective frequency fading". The lack of these notes, however, is not a serious problem, because it is very unusual for conditions to be so unbalanced as to completely destroy reasonable quality.

One thing, however, which very quickly destroys all reasonable quality, is to have the carrier frequency fade. Assume a condition of 100% modulation. Assume that none of the side bands are fading at any particular instant, but that the carrier frequency alone does. It is obvious that this produces an effective modulation greater than 100%, and gives the type of curve indicated in Figure 5 for 200% modulation. This distortion is extremely bad and is noticed immediately by even those who are not musicians. This condition of frequency fading is distinctly different from that of volume fading, wherein the whole signal, carrier and side bands, might fade. In the case of volume fading, automatic volume controls will maintain the signal reasonably constant as to quality. In the case of carrier fading, no known means of correction is now applied in the usual receiver.

While conditions with respect to frequency fading vary with the time of year, condition of night, distance and power of the station being received, several checks have indicated that approximately 75% of all distant stations may be expected to show this phenomenon of selective frequency fading, and, as a result, give bad distortion. It is for this reason as much as any other that most radio sets are tuned on local stations to give that indefinable something known as "good quality". Distant stations are shunned because of the distortion resulting from this frequency fading. This condition is rapidly becoming worse as modern transmitters tend to approach 100% in modulation effectiveness. Years ago, when modulations of 5% and 10% were in order, a carrier could fade to as little as one-tenth normal value without causing noticeable impairment in quality. Today, with average modulations running from 40% to 50% and sustained passages reaching close to 100%, a slight amount of fading in the carrier will produce this distortion. It is desirable to maintain our high percentages of modulation at the transmitter or to even increase them if possible, as thus increasing the percentage of modulation increases the service area of the station, without increasing its interference area. This trend, of course, will make the present noted conditions still worse.

Two general methods of solution are possible. The first means of solution is one which will make the detector conscious of reversal in phase. The second method is to artificially (in the radio receiver) reduce the percentage of modulation to a point where it may be satisfactorily handled by the (apparently) normal detector.

In Figure 5 with 200% modulation it will be noted that the sine wave envelope crosses the zero axis to form a small cusp before again crossing to give the normal repeating characteristics. Where the sine wave envelope crosses the zero axis there occurs a reversal of phase in the apparent single frequency-variable amplitude curve as shown in Figure 6.

Figure 7:
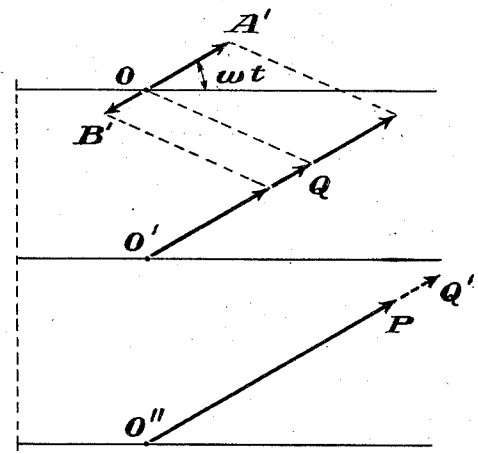
Fig. 7 is a vector diagram of the amplitude vector of a modulated signal showing the change in phase of such signal when such amplitude vector becomes negative in value and also showing the result of the addition of a constantly positive vector to the variable vector.

In order to understand the reasons for this let us refer first back to Figure 2. If $a$ is the amplitude vector of the carrier and $b$ the amplitude vector of either of the side band frequencies, assumed to change in angle to $\dot{a}$ by the plus or minus angle $\theta$ it will be seen that the sum of the vectors i. e. the resultant amplitude vector of the modulated wave is equal to $\dot{a}+2\dot{b}\cos\theta$, a single rotating but varying vector. The magnitude of $\theta$ is in constant proportion to $\omega t$ the angular variation of the modulated sine wave and the equation of this wave is therefore $(\dot{a}+2\dot{b}\cos k\omega t)\cos\omega t$, $k$ being a constant. Referring now to Figure 7, which shows the amplitude vector of the wave it will be seen that so long as the value of this vector is positive the phase relationships of the wave are maintained although the amplitude will vary. When, however, the value of $2\dot{b}$ becomes greater than $\dot{a}$ the vector will, when the value of $k\omega t$ is between $(2n+1/2)\pi$ and $(2n+3/2)\pi$, $n$ being an integer and when $2\dot{b}\cos k\omega t > \dot{a}$ assume a negative value becoming now $\overline{OB'}$ instead of $\overline{OA'}$. It is obvious that this causes an actual reversal of phase of 180 degrees in the actual wave. If, however, a constant positive vector of the same direction, say, $\overline{O'Q}$, is added which is greater than the possible minus variation of the vector $\overline{OB'}$ then the resultant vector will always remain positive and reversal of phase can no longer occur. It is also obvious that if the magnitude of this constant vector $\overline{O'Q}$ is large in proportion to the distance between A' and B' that the percentage of modulation in the resultant signal is correspondingly small. This constant vector $\overline{O'Q}$ represents a constant carrier of the same frequency which may be locally generated as will later be shown. It may also, as will be later shown, be not wholly constant i. e. be modulated with useful results.

In the normal type of detecting device, an assymmetrical voltage response characteristic is utilized. Figure 5 with 200% modulation shows the audio frequency wave form resulting from more than 100% modulation. This operation is based purely on static voltage relationships, and gives the noted results, regardless of phase or frequency of the applied signal. However, if a multi-element tube be employed as a detector, the incoming modulated carrier being placed on one control grid, while a local alternating voltage (as distinguished from the fixed or static direct voltages) of the same frequency as the carrier voltage, be placed on a second control grid, a new condition of operation asserts itself. Both grids, and the respective voltages thereon, exert a control on the plate current of the tube. If, for example, $\overline{A'B'}$ in Figure 7 is 1.5 $\overline{OA'}$ with a resulting 300% modulation, giving with the ordinary receiver hopelessly bad reception the addition of $\overline{O'Q}$, (the local alternating voltage) having a value of $3\overline{OA'}$ will reduce the effective modulation to 37.5%, i. e. 1.5 $\overline{OA'}/\overline{OA'}+3\overline{OA'}$ which is entirely satisfactory.

If the modulated carrier frequency should shift, the action would no longer be maintained. My detector is therefore no longer simply a function of static voltages, but becomes a dynamic device, responsive to phase and frequency. It will detect properly only when the correct frequency is applied to the first (or second) control grid. This fundamental principle of a dynamic detector and the instrumentality necessary to accomplish the desired results forms the first method of solution of my invention.

The second method of accomplishing the desired result is to artificially reduce the percentage of modulation. This may be done by simply adding to the incoming signal, in a proper mixing circuit, a locally generated alternating current of the same frequency as the incoming carrier.

Either method requires:

1. A source of local energy having identically the same frequency as the incoming carrier, and having substantially a sine wave form (partially modulated or not), at the desired operating conditions;

2. Means to prevent the transmission and/or reproduction of disturbing beat frequencies, whistles or the like which may result when not at the desired condition of operation (beats between the local source and the incoming carrier);

3. Means to introduce the local source of energy and the incoming modulated carrier in a detector circuit in a proper manner.

The first requirement may be met as follows. In the present state of the art it is impossible to set up one oscillator (a transmitter) and to maintain at some distant point (the local source of energy) a second oscillator at identically the same frequency, without some control network. In this case I propose to utilize the incoming carrier frequency as a control for the local source of energy. To illustrate the mechanism of such a control, consider the simple oscillator circuit. A normal change in frequency with respect to change in tuning capacity of such a circuit is indicated in Figure 9. This curve indicates that the change in frequency of oscillation is a continuous function with respect to the tuning capacity $C_1$. However, if, in Figure 8, an incoming signal voltage of the frequency $f_1$ be impressed on the terminals V, a curve will result such as shown in Figure 10.

Figure 8:
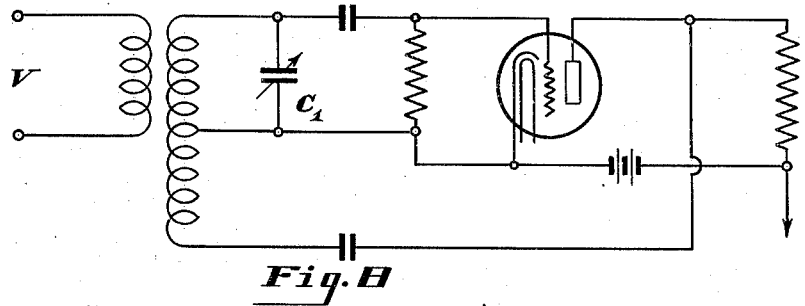
Fig. 8 is a diagram of an oscillator locked in to an incoming frequency.
Figure 9:
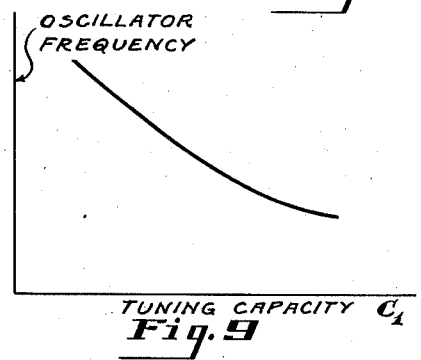
Fig. 9 is a diagram of the condenser setting of an ordinary oscillator vs. the frequency of oscillation.

This is because of the fact that when the frequency of the circuit shown in Figure 8 approaches the frequency $f_1$, the latter frequency exerts a control over this oscillating circuit and draws it in step with $f_1$. As a result, between the points marked M and N, the local oscillator of Figure 8 continues to oscillate at the frequency $f_1$, in spite of the fact that the tuning characteristics of the circuit in Figure 8 are being varied by turning the condenser $C_1$. It is this effect of which I take advantage in using a local oscillator in the detector system of the present invention.

Figure 10:
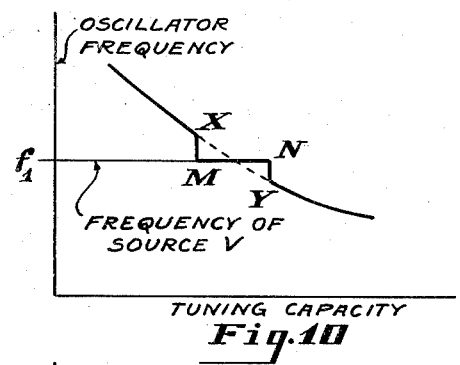
Fig. 10 is a diagram of the condenser settings vs. the frequency in the case of a locked in oscillator.
Figure 11:
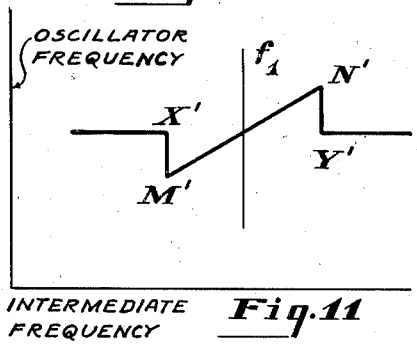
Fig. 11 is a diagram of the change in frequency of an oscillator of relatively fixed frequency locked in to an incoming variable frequency.

The variable tuned circuit of Figure 8 and resulting effect indicated in Figure 10 would be used in the application of my invention to a tuned radio frequency receiver. As I prefer to here show the complete embodiment in a superheterodyne radio receiver, some modification is necessary. In this case, as the receiver is tuned, the signal modulated energy impressed upon the intermediate frequency amplifier varies. The normal local oscillator should therefore be fixed, preferably at the frequency of the intermediate frequency amplifier. The frequency chart would then appear as in Figure 11. As the receiver is tuned from a lower frequency towards the frequency of an incoming modulated carrier, the frequency of the intermediate frequency energy due to that modulated carrier is increased, the local oscillator stays at a constant frequency (set equal to the tuned peak of the I. F. amplifier) so long as the intermediate frequency signal is less than the I. F. amplifier frequency by some predetermined value that is dependent upon the degree of coupling between the local oscillator and the circuit between terminals V, Fig. 8. At the point X', the local oscillator suddenly drops in frequency to the value M' equal to the frequency of the intermediate frequency signal. As the tuning of the receiver is continued, the local oscillator stays locked in with the intermediate frequency signal to the point N', where the respective voltages are such that the incoming intermediate frequency signal can no longer control and the local oscillator again resumes its normal frequency at the point Y'.

Figure 12:
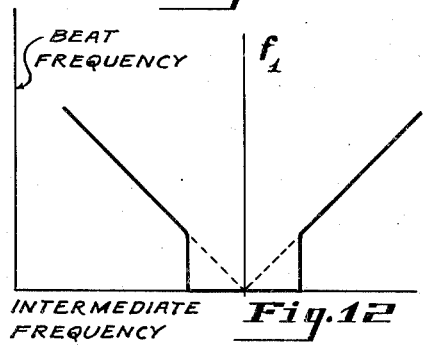
Fig. 12 is a diagram of the beat frequency existing between the frequency of a fixed oscillator tied in to an incoming variable frequency vs. the incoming variable frequency.

This action can perhaps be better illustrated by reference to Figure 12, which shows the beat frequency between the local oscillator and the incoming I. F. After the previous discussion, no other seems necessary.

Figure 13:
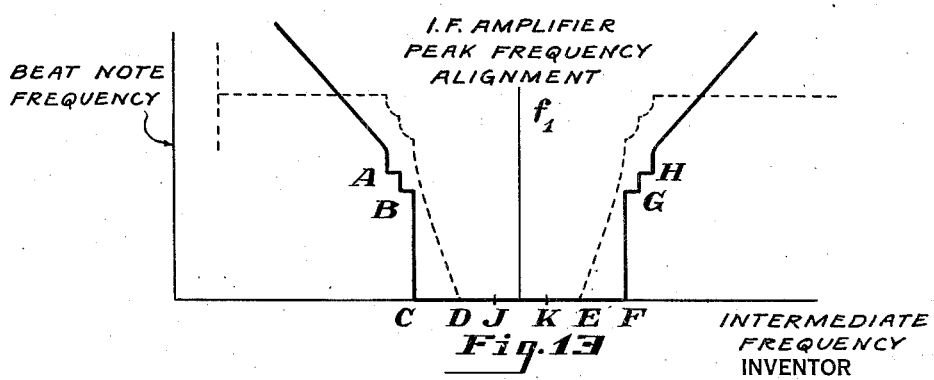
Fig. 13 is a diagram similar to Fig. 12 but showing the response of the beat frequency in the case of a locked in oscillator receiving a modulated frequency and showing certain characteristics of the herein described method of operation of a receiver.

In the case of a modulated signal, the case is not quite so simple. The shift from the local frequency to the incoming frequency is accomplished in jumps as at A, B, C, G, F, and H, the side band frequencies seemingly aiding in establishing stable points. I have also discovered another effect, of which by proper construction I take great advantage. If the local oscillator is quite stable in amplitude as its frequency and voltages are varied, the normal modulation on the incoming signal disappears and a substantially pure carrier wave without modulation results in the oscillator plate circuit. These effects with a modulated signal are shown in Figure 13. The solid line is the beat note frequency between the local oscillator and the incoming carrier, the broken line being the limit under which a modulated frequency is produced. There are also beats between the local oscillator and incoming side bands (when the side bands are continuous). All of these produce serious noise between stations unless means are adopted to suppress it. That is to say, below the point C and above the point F in Figure 13, annoying whistles will be heard unless suppressed. This noise may be suppressed by utilizing the method and means outlined in the above cited co-pending application. After the point C is reached, a modulated carrier frequency results. As the tuning is carried further, this modulation decreases and between points D and E a substantially pure carrier wave at the incoming frequency results. This serves as the source of local energy previously shown to be necessary.

A receiver having a modulation frequency amplifier and/or reproducer operative over a wide range of modulation frequencies should therefore be silenced when tuned beyond the points C and F, Figure 13. As a matter of fact, I prefer to maintain such silence beyond the points D and E, Figure 13. This may be accomplished by preventing transmission of modulation frequencies beyond the second detector of the receiver, for example by blocking the audio amplifier, or by keeping the detector from detecting, or by preventing the oscillator from oscillating, except between points D and E of Figure 13. In brief, I make use of an independent sufficiently selective circuit, tuned to the I. F. amplifier peak, to operate a silencing mechanism (which may be of different types such as electron tube, relay, Thyratron, etc.) when the receiver is detuned from the I. F. amplifier peak more than a certain desired amount. Thus, if the receiver is detuned to a lower frequency, the audio system might stop transmitting the signal at the point J, Figure 13. If further detuned, until whistles are produced by the detector below point C, no harm is caused, as these whistles cannot be heard in the reproducer. Similarly, tuning to produce a higher I. F. results in no signal beyond the point K, Figure 13. The tuning range within which reproduction is permitted therefore is restricted to an accuracy of receiver tuning within the limits J—K of Figure 13. In a practical operating case the frequency range from J to K was 2.4 kilocycles. This meant that the receiver would give an audible response only when tuned within + or − 1.2 kilocycles of resonance. As the lock in and audio transmission bands were much wider, the system operated satisfactorily. The details of a complete operating system may be seen in the circuit diagram of Figure 14.

The third requirement may be taken care of as follows: It may be shown that any shift in phase of the side bands with respect to the carrier results in frequency modulation. The addition of the local carrier therefore should be exactly in phase with the incoming carrier. As due to the nature of the "lock-in" phenomenon, this phase relation must shift slightly, this ideal condition is impossible except when tuned exactly on resonance. If the signal response band J—K of Figure 13, is fairly small with respect to the lock in band C—F, the local oscillator phase will stay fairly close to the phase of the incoming carrier over the operating range J—K. I have, however, further found that by greatly increasing the local carrier effect on the detector with respect to the incoming signal, this distortion is substantially eliminated, regardless of phase. It is interesting to note that the local carrier may be applied 180° out of phase with the incoming carrier with substantially the same detection results. The amplitude of the local carrier should be many times that of the incoming carrier for best results. I have found a ratio of from 5 to 20 times to be satisfactory when both are simultaneously applied to the same detecting element. When applied to different electrodes of the same tube, the ratio depends on the respective control of those elements, but the above principles hold.

Figure 14:
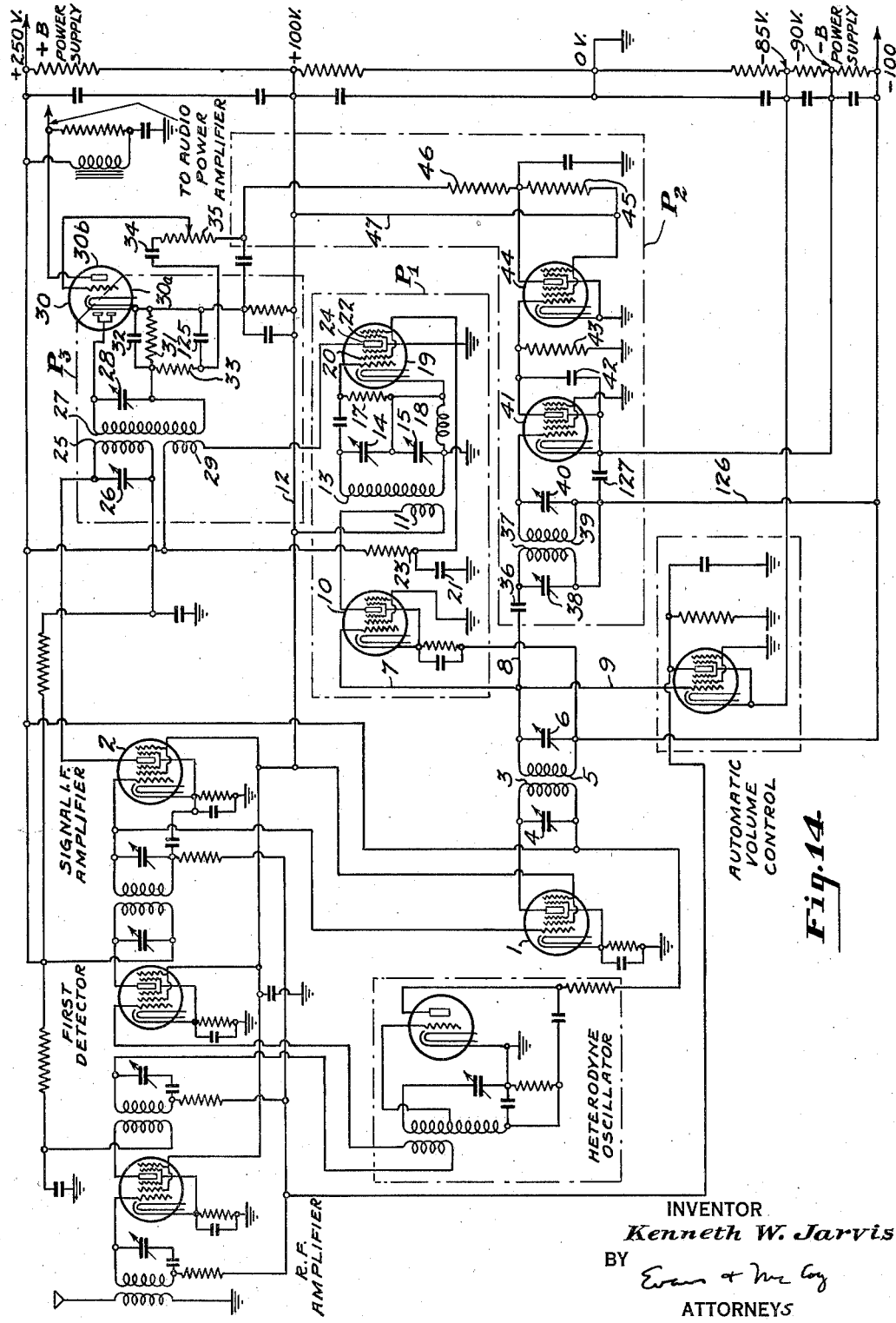
Fig. 14 shows a complete circuit diagram of a receiver constituting a suitable embodiment of my system of operation and means for achieving the same.
Figure 15:
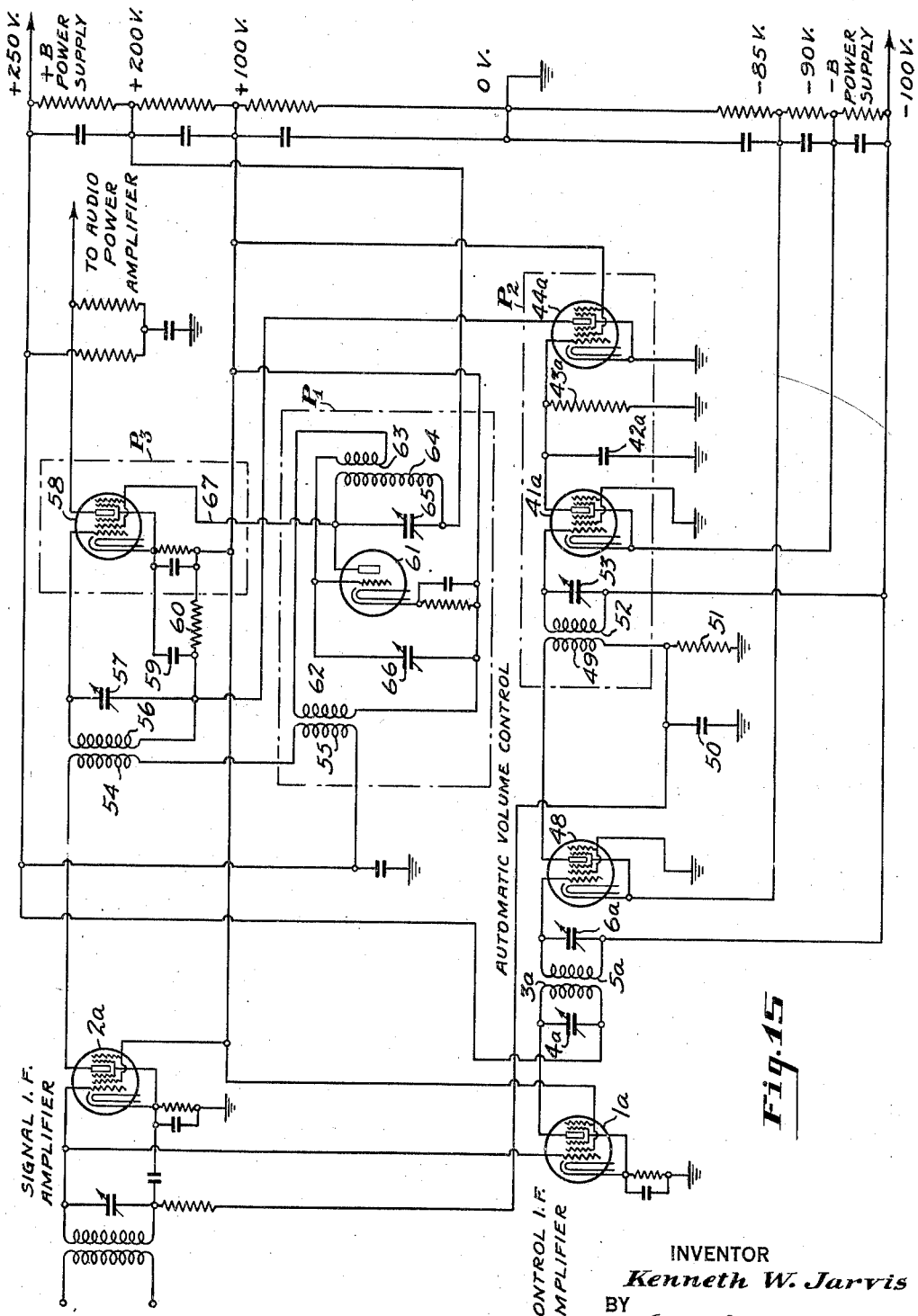
Figs. 15 to 17 are partial circuit diagrams of receivers showing alternate means for carrying out the principles of operation herein described.
Figure 16:
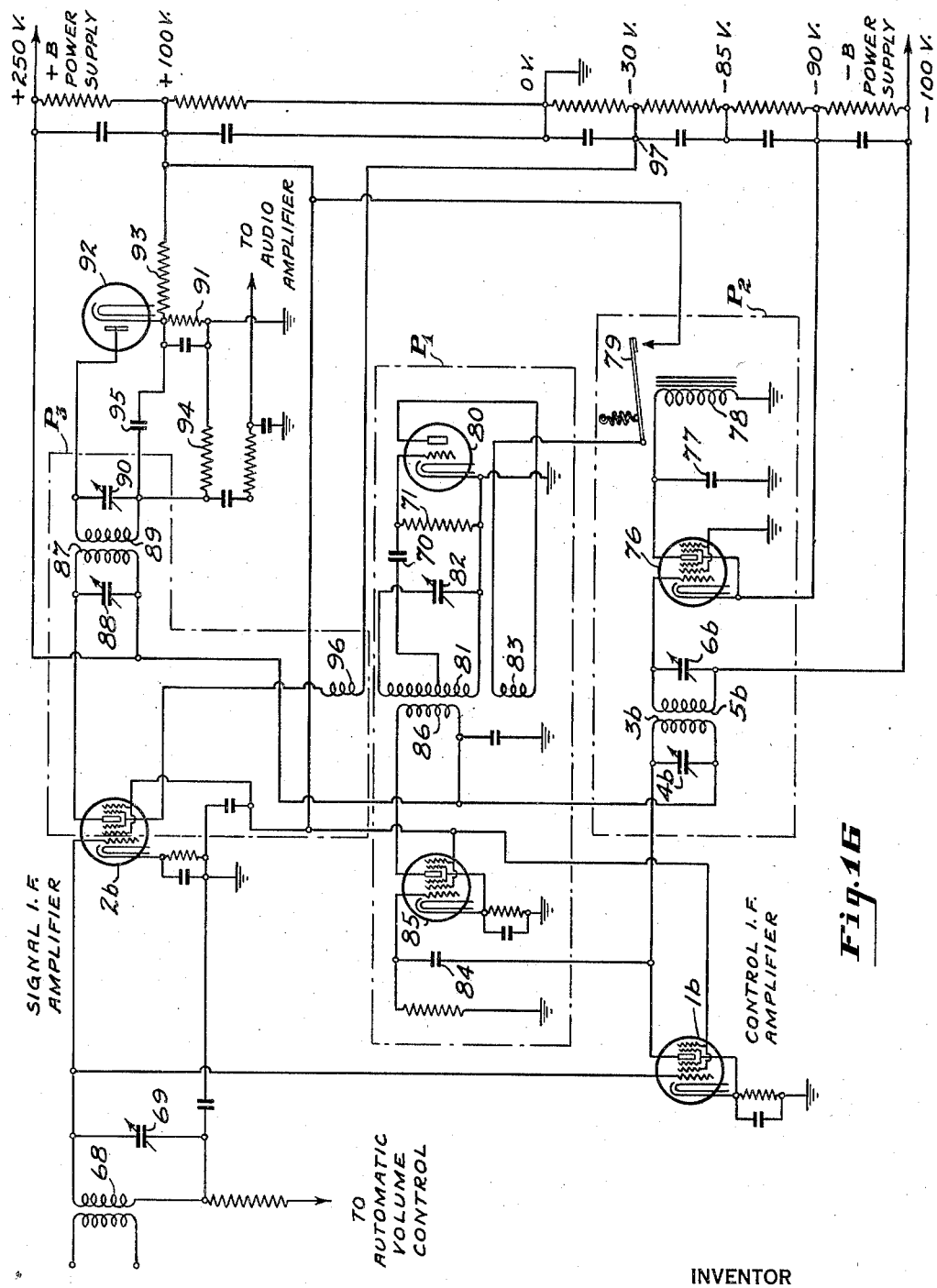
Figure 17:
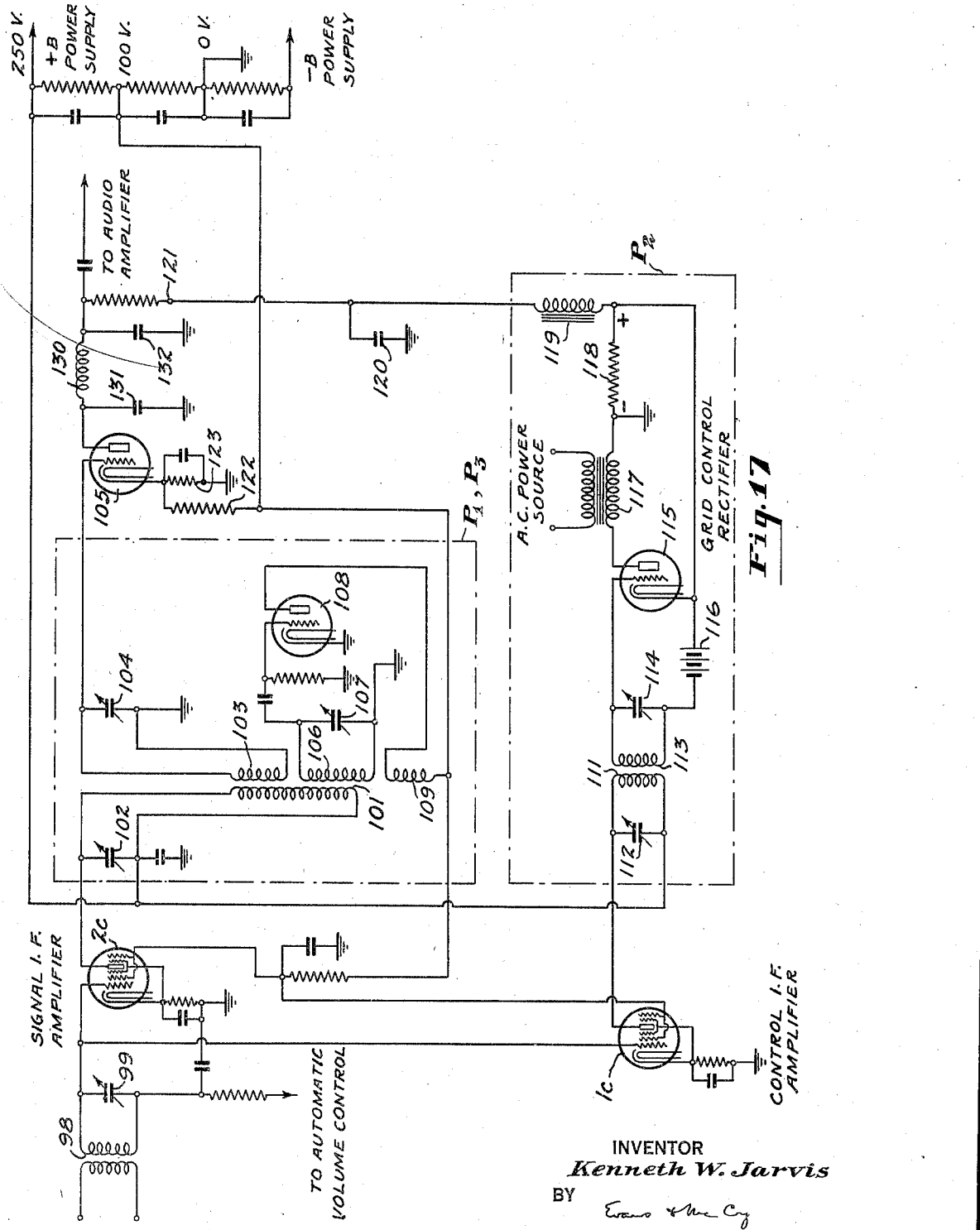

Figure 14 shows a complete operating circuit, from the antenna to the audio power amplifier lead. Figures 15 to 17 show only that portion of this complete circuit diagram which illustrate the principles of this invention. Only those portions about which detailed description is needed have been numbered. The other portions of the circuit have been labelled to indicate their general functions. In Figure 14 two intermediate frequency amplifier tubes 1 and 2 are indicated, connected wth their input grids in parallel. One of these, 2, is for signal amplification and is so indicated. The other, 1, serves as an amplifier for all the control functions, i. e., automatic volume control, dynamic detector oscillator control, and silencing control. The output of the control I. F. amplifier 1 comprises a tuned circuit with inductance 3 and capacity 4. This circuit is inductively coupled to a tuned circuit comprising inductance 5 and capacity 6. This tuned circuit feeds the dynamic detector oscillator control through lead 7, the silencing control through lead 8, and the automatic volume control through lead 9. The lead 7 goes to the control grid of an isolation amplifier tube 10, whose plate is connected through a coil 11 to a source of potential at 12. Coil 11 is inductively coupled to a coil 13, which is a part of a tuned circuit consisting of coil 13 and condensers 14 and 15 in series. This tuned circuit is connected to a tube 19 in such a manner as to form an oscillation circuit. The grid 20 of tube 19 is connected (with respect to alternating current)

to ground through condenser 21 and is connected to the plate potential through the resistance 23. The grid 22 is connected to ground. These two grids form a virtual anode of the oscillator tube 19 while the actual plate 24 is said to be "electron coupled" to the oscillator proper. When signal energy flows in the tuned circuit of 3 and 4, it follows the chain of elements just described and is impressed in the oscillation circuit of 13, 14, and 15 through the medium of coil 11. This impressed energy serves to control the frequency of oscillation of tube 19 as described previously and illustrated in Figure 13. Within the desired operating limits, the frequency of the energy flowing from the plate 24 is now the same as the incoming carrier frequency. A grid leak 17 and I. F. choke coil 18 are necessary for proper oscillation in the circuit shown. The magnitude of the lock in range and the correct adjustments for complete demodulation of the applied signal are obtained by proper proportioning of the coupling between and values of coils 11 and 13, the relative sizes of condensers 14 and 15, the value of the grid leak 17 and the series screen grid resistance 23. The values are not hard to obtain, nor critical as to adjustment. The essential facts to be considered have already been discussed.

The output of the signal I. F. amplifier 2 comprises a tuned circuit consisting of inductance 25 and condenser 26. This is coupled to a secondary circuit comprising inductance 27 and condenser 28. Also coupled to this latter tuned circuit is a coil 29, through which the plate current of oscillator 19 flows. It is therefore obvious that the energy in the tuned circuit of 27 and 28 is both the incoming modulated signal arriving by way of circuit 25 and 26, and the unmodulated carrier coming by way of coil 29. Both sources of energy build up a voltage which is applied to the diode detecting elements of the diode-triode tube 30. The diode part of this tube 30a is used for the detector and the triode part 30b, as the first stage of the audio frequency amplifier. This combination is unessential; separate tubes would work as well. A triode detector could be substituted for the diode detector 30a, a pentode amplifier for the triode amplifier 30b, etc. The circuit is shown this way here to conform exactly to that which was used in a complete operating model. A resistance 31 which is placed in parallel with a condenser 32 connecting the cathode of tube 30 with the low side of tuned circuit, 27 and 28, forms a direct current load to aid in producing linearity in the detector. It also forms the audio frequency load for the rectified audio component which is transferred to the volume control resistor 35 by way of the filter resistance 33 and the coupling condenser 34. A condenser, 125, connecting from the resistance 33 to the cathode of tube 30 is a radio frequency bypassing condenser. Resistance 33 forms an impedance in series and the capacity 125 in shunt, serves to bypass any intermediate frequency so that the intermediate frequency voltage which is developed across resistance 31, although bypassed with condenser 32, is still further filtered before reaching the grid of the triode section of tube 30b.

I have thus built up two parts of the three desired parts of my invention. Those elements inclosed in the dashed rectangle indicated as P₁ provide for the generation of a substantially unmodulated carrier, with a frequency equal to that of the incoming signal. Those elements inclosed in the dashed enclosure indicated as P₃ provide for the proper combination of the incoming signal and the local dynamic detector oscillator and the application of this combination to a detecting element. There remains only the silencing of the system when detuned beyond the points J and K of Figure 13. This is accomplished through the elements enclosed by the dashed line of P₂. The fundamental principles of this method of silencing through the use of selective circuits for control purposes are taught in the above cited co-pending application. The action may here be briefly described, however.

The energy fed through connecting lead 8 flows through the very small condenser 36 to the very selective circuit comprising inductance 37 and condenser 38. This circuit is coupled to a second selective circuit comprising inductance 39 and condenser 40. Sufficient selectivity may at times be obtained if the condenser 36 feeds the circuit of 39 and 40 directly, thus omitting the circuit of 37 and 38. The voltage across the circuit of 39 and 40 is applied to the control grid of the rectifying tube 41, which is held normally negatively biased by the lead 126 to the −100 volt point of the B power supply the cathode being maintained at −90V. A high frequency bypass condenser 127 is inserted from the cathode of tube 41 to this lead. When turned sufficiently close to the desired signal (between J and K of Figure 13), a sufficient voltage will be impressed on the control grid of tube 41 to cause a direct current to flow through the plate resistance 43. The alternating components of the plate current are bypassed by the condenser 42. The direct voltage across the resistance 43 is applied to the control grid of the silencing tube 44. In the plate circuit of this silencing tube 44 is connected a resistance 45. Reference to the leads 46 and 47 shows that any voltage across the resistance 45 is connected between the volume control resistor 35 and the cathode return point of the tube 30. Thus any voltage across the resistor 45 serves to bias negatively the triode section of the tube 30. As described above, when tuning near resonance is obtained, a voltage will exist across the resistor 43. This voltage serves to bias the tube 44 below cutoff and no current flows through resistance 45. The bias on the triode part of the tube 30 is therefore normal and the tube will act as an audio amplifier. When the receiver is detuned more than the specified amount, substantially no voltage exists across 43, and the tube 44 draws plate current. This produces a large voltage across 45 which biases the triode section of 30 below cutoff and so prevents any audio signal from being transmitted. As this audio transmission cutoff occurs before the receiver can be detuned into a region where whistles would be obtained, the third desired feature of this invention is accomplished.

In this circuit of Figure 14 are shown various bypass condensers, load resistors, filter resistors, bias resistors, etc. These perform no specific function with reference to this invention except to provide the customary circuit conditions common to normal radio receiving sets. As the purpose of such elements is immediately obvious to anyone skilled in the art no further detailed description is necessary.

Figure 15 shows another circuit arrangement to give the results desired by my invention. As before, a control I. F. amplifier 1a feeds a tuned circuit 3a and 4a, which is coupled to a tuned circuit, 5a and 6a, which in turn feeds the control grid of an automatic volume control tube 48. The alternating current component of the plate current of the A. V. C. tube 48 flows through coil 49 and bypass condenser 50. The direct current component builds up a voltage across a resistance 51 which acts to automatically control the gain ahead of this point and so control the volume. Alternating current in the coil 49 induces a voltage in a tuned circuit 52 and 53, which is applied to the control grid of a rectifier tube 41a. The condenser 42a bypasses the alternating component of the plate current of the tube 41a. A direct voltage is built up across the resistance 43a in the plate circuit of this tube, when the very selective circuit, 52 and 53, is nearly tuned to the desired I. F. As before, this biases the silencing tube 44a to cutoff so no plate current flows, and this tube has no effect on the normal operation of the circuit.

Referring now to the signal input circuit, a signal I. F. amplifier 2a feeds through coils 54 and 55 connected in the output circuit. Coil 54 couples into the tuned circuit constituted by inductance 56 and condenser 57. The modulated signal is then impressed on the control grid of a detector tube 58. The low side of the tuned circuit of 56 and 57 feeds through a condenser 59 to the cathode of the detector 58. The plate of the silencing tube 44a is connected to its source of plate potential through a resistance 60. When the receiver is detuned more than a desired amount (beyond J—K of Figure 13), the tube 41a ceases to draw current and no voltage exists across resistance 43a. Current now flows in the plate circuit of the silencing tube 44a and a large voltage exists across the resistance 60. This biases the detector so far below cutoff that no detection can take place, and the system is effectually silenced. The detector can operate properly only when tuned substantially correctly.

A locked in oscillator system of the tuned grid-tuned plate type, contained in the rectangle P₁, consists of a tube 61, having in its grid circuit a tuned circuit consisting of inductances 62 and 63 and a condenser 66 and in its plate circuit a tuned circuit consisting of an inductance 64 and condenser 65. The inductance 62 is coupled with the inductance 55 and receives therefrom energy at the intermediate frequency while the inductance 63 is coupled with the inductance 64.

The frequency control and lock in range of the oscillator system P₁ is controlled by the coupling between the coils 55 and 62 and between the coils 63 and 64. The lock in action of the grid feedback type of oscillator is essentially as previously described for a different type of oscillator.

A second control grid of the detector tube 58 is connected directly to the plate terminal of the oscillator tube 61 by a lead 67. (Inductive coupling or another coupled tuned circuit are obvious possible variations.) The voltage applied on this second control grid is therefore the applied direct voltage on the plate of the oscillator, say +100 volts, plus or minus the instantaneous alternating voltage across the tuned circuit, 64 and 65. The plate current (and the detection) of the tube 58 is therefore a function of the modulated signal I. F. on the first control grid and of the substantially unmodulated I. F. on the second control grid. When the two signals are in phase their effects are additive. When, due to modulation greater than 100%, the two frequencies are out of phase, their effects will be subtractive, and the detector is therefore responsive to this phase reversal. Correct undistorted detection is therefore obtained.

Tube 58 is of the screen grid—suppressor grid type, inasmuch as this type of tube is commercially available in the type No. "57" which has been actually used for this service, and which performs with reasonable efficiency although not specifically designed for this double control purpose. It is obvious that a tube of the screen grid type, with or without a suppressor grid and with two control grids more specifically designed for the purpose, would operate as well or better.

The elements inclosed in P₁, as before, have to do with generating the local detecting frequency. The elements in P₂, similarly, comprise the system for silencing the receiver when mistuned. The elements within the block P₃ comprise the local oscillator and the circuit connections to the signal amplifier and the second detector.

Another circuit arrangement is shown in Figure 16. In this case the functions of silencing, producing the desired local carrier frequency and proper combination for detection are so interrelated as to make simple dashed enclosures showing P₁, P₂, and P₃ almost impossible. The enclosures shown are the best compromise between simplicity and accuracy. The automatic volume control tube and circuit are omitted for simplicity. Figures 14 and 15 indicate how this can be applied, as can almost any normal A. V. C. arrangement.

In Figure 16 an input circuit consisting of inductance 68 and condenser 69 feeds the control grid on a signal I. F. amplifier 2b and also feeds the control grid on a control I. F. amplifier 1b. The plate circuit of the amplifier 1b includes an inductance 3b and capacity 4b, comprising a selective tuned circuit. This is coupled to a very selective tuned circuit comprising an inductance 5b and a capacity 6b. This very selective circuit feeds the control grid of the rectifier tube 76. The alternating current in the plate circuit of the tube 76 flows through the condenser 77 to ground. The direct current component of the plate current flows through the electromagnet of relay 78. When tuned correctly (between J and K, Figure 13) a voltage will exist across the tuned circuit of 5b and 6b and current will flow through the relay 78. This energizes the relay armature and closes contacts 79. This closes the plate circuit of the oscillator tube 80 and this tube begins to oscillate.

This oscillator system enclosed in the rectangle P₁, is of the tickler feed back type, having in its plate circuit the tickler coil 83 in inductive relationship with the tuned circuit comprising inductance 81 and condenser 82, the grid of tube 80 being connected through condenser 70 to a proper point on inductance 81 and being connected through resistance 71 with the cathode of tube 80.

The control I. F. tube 1b has a condenser 84 connected to its plate terminal. The I. F. voltage built up across the tuned circuit of 3b and 4b is applied through this condenser to the grid of the isolation tube 85. The plate circuit of the tube 85 comprises coil 86 which is inductively coupled to the oscillator coil 81. The I. F. current flowing through the coil 86 exerts a control on the oscillator frequency of the tube 80 and its associated networks as previously described. This control is such that after the tube 80 is permitted to oscillate by the closing of the contacts 79, it will always oscillate at the frequency of the current flowing through 86. The condition here is therefore slightly different than the previous cases, where the beat notes could not be heard due to transmission cutoff. In this case no beat note can occur as the control is exercised even before the oscillator 80 is turned on.

It is advisable to hear no signal until the oscillator is turned on. This could be accomplished by the dual control of the oscillator as here described, and of the audio transmission channel as in Figure 14. Another simple method is here described. Assume the relay contacts 79 are open and the oscillator 80 is dead. The signal I. F. amplifier 2b generates a signal voltage across a tuned circuit comprising the inductance 87 and the condenser 88. This transfers the signal to the next tuned circuit having inductance 89 and condenser 90. This signal is applied to the diode detector 92. The diode element is biased negative by a current flowing through the resistance 91. A bleeder current through the resistance 93 provides this initial bias current. Refer now to Figure 4. Whenever the diode potential with respect to the cathode is negative no current will flow and no detection will result. If, in the present case, the peak signal I. F. impressed on the detector is 7 volts, while the initial bias is 10 volts negative, no detection will result and the receiver will be silent. The resistance 94 provides an A. C. load when detection results, and the condenser 95 provides an I. F. bypass when needed.

One of the grids (the so called "suppressor grid") of the tube 2b is connected through the coil 96 to a point of reference potential. The oscillatory current through the coil 81 induces a voltage in the coil 96 which is impressed on the indicated grid of tube 2b. This unmodulated I. F. adds to the incoming signal I. F. (when in phase) and is impressed on the diode detector 92 as an added signal. The total of the unmodulated I. F. and the signal I. F. may be as much as 40 volts peak, and so far stronger than the initial negative voltage on the diode. Detection results and the signal is heard, but only after the oscillator 80 is turned on and properly combines with the signal I. F. If, due to more than 100% modulation, the phase of the signal I. F. on the grid of the amplifier tube 2b reverses in phase, the plate current will be the difference of the signal I. F. and the unmodulated I. F. As the introduced unmodulated I. F. is made several (or many) times the signal I. F., the phase, so far as the subsequent detector is concerned, never reverses and undistorted detection results.

In the circuit as shown in Figure 16, the connection through the coil 96 is returned to the point 97 which is about 32 volts negative with respect to the cathode of tube 2b. This is done to put such a potential on the grid (to which the coil 96 is connected) as to make the operating characteristic correct. Too low a voltage on this grid (the suppressor grid in a Type 58 tube) results in very inefficient control. Too much negative voltage destroys the amplification ability of the tube. This circuit detail is not intended as a restriction on the general method, but merely indicates that correct potentials must be applied to the tube control elements for effective operation. Using a screen grid as the second control element would probably require a positive voltage, as in Figure 15. Again the essential elements of the invention are included, but in a circuit of definite difference from Figures 14 and 15.

Figure 17 is given as also comprising all the essential elements in a circuit much simpler than those of Figures 14, 15, and 16.

Coil 98 and condenser 99 comprise a tuned circuit which feeds signal and control I. F. amplifiers 2c and 1c, respectively. The signal I. F. amplifier tube 2c feeds a tuned circuit consisting of inductance 101 and capacity 102. This circuit in turn feeds a tuned circuit consisting of inductance 103 and condenser 104. The voltage across this circuit is impressed on the control grid of detector 105. Coupled to coils 101 and 103 is another inductance, 106, which, with condenser 107, forms the tuned circuit for the oscillator tube 108. This tube is made to oscillate due to the feedback of tickler coil 109 in its plate circuit and in inductive relationship to coil 106. The condenser 107 is tuned so that the normal oscillation frequency falls at the center of the I. F. amplifier peak voltage. When the incoming signal frequency is slightly different than the normal oscillation frequency, the coupling between coil 101 and coil 106 serves to exercise control over the oscillator and it will lock in over the desired band as previously described. This lock in band may be controlled by the relative coupling of the coils 101 and 106, and the strength of oscillation of the oscillator 108. This frequency controlled oscillation voltage developed in the circuit of coil 106 and condenser 107 is transferred to the circuit of coil 103 and condenser 104 due to common inductive coupling between coils 106 and 103. As the signal I. F. has already been introduced in the circuit of 103 and 104, the voltage from the local oscillator is added to the incoming carrier in a manner previously shown to be desirable. The relative coupling between the coils 101, 103 and 106 determines the lock in band and also the relative magnitudes of incoming signal and local oscillator oscillations impressed on detector 105. Therefore the elements indicated as $P_1$, the lock in band control, and as $P_3$, the introduction of the local signal, are shown by the same dashed line rectangle.

The other element comprising means for silencing the receiver whenever the local oscillator is not locked in and demodulating the incoming signal, is shown in the dashed rectangle indicated as $P_2$.

A control I. F. amplifier tube 1c feeds a very selective circuit comprising coil 111 and condenser 112. This in turn feeds a second very selective circuit comprising coil 113 and condenser 114. This tuned circuit feeds the control grid of a Thyratron type tube 115. This tube, in the absence of signal voltage across the trigger or control circuit, 113 and 114, is made nonconducting by the action of a negative bias voltage 116 acting on its control grid. An A. C. source of power is indicated at 117. When a signal is present across the circuit of 113 and 114, the positive peaks momentarily reduce the control grid voltage on tube 115, and the plate starts drawing current. This action is completely explained in my co-pending application, above cited, and need not be further enlarged on here. When plate current flows, a voltage is built up across the resistance 118 with the average potential signs as shown. The alternating components of the voltage across 118 are filtered out by the choke coil 119 and bypass condenser 120. As the negative side of resistance 118 is connected to ground, as is the cathode of detector tube 105, and the positive side of resistance 118 is connected to the detector 105 plate return 121, the Thyratron tube 115 serves as a grid controlled rectifier to furnish plate potential to the detector 105. In the absence of plate voltage, the grid of detector 105 is maintained negative by bleeder current flowing through the resistance 122 and the cathode resistance 123. An intermediate frequency choke 130 is introduced in the plate circuit of detector 105, the condensers, 131 and 132, on either side of this choke leading this frequency to ground. When no plate voltage exists on the plate of detector tube 105, no detection can take place and no signal is heard. As due to the width of the lock in band, and the sharpness of the control circuits of 111, 112 and 113, 114, no detector 105 plate voltage is available until after the oscillator 108 is properly locked in with the incoming signal, transmission of the signal is prevented beyond the detector 105, except when this locking in is present. The requirements of my invention have therefore been met in this circuit arrangement.

A table of type numbers of tubes which may be used in the various locations shown in Figures 14 to 17 follows. It is to be understood that any type number indicated for a given location represents merely an available commercial design for the purpose set forth; that it does not necessarily connote the best possible design nor a limitation on design.

*Table I*

| Tube numbers, Figs. 14–17: | Type numbers |
|---|---|
| 30 | 2A6 |
| 92 | 55 |
| 61, 80, 105, 108 | 56 |
| 19, 41, 44, 41a, 44a, 48, 58, 76 | 57 |
| 1, 2, 10, 1a, 2a, 1b, 2b, 85, 1c, 2c | 58 |
| 115 | Thyratron |

The combination of the three principles outlined, together with the various types of mechanisms which make each operative, forms the basis of this invention. It is, of course, possible to devise many mechanisms for carrying out these principles. Accordingly, therefore, I have detailed a number of these circuit arrangements each of which conforms to the fundamental principles previously outlined, in order to show the functional relationships in my invention. In each of the four circuits shown, the mechanisms of respective principles indicated as $P_1$, $P_2$, and $P_3$ in the dashed line boxes, are quite different in each case. Furthermore, $P_1$ of Figure 14 may be combined with $P_2$ of Figure 17 and with $P_3$ of Figure 15 to form another working combination. Other combinations of the elements here indicated are of course possible. Still other details may be changed by the use of types of tubes other than those here indicated. Many similar modifications may be made without departing from the spirit of this invention.

While I have heretofore for the purpose of simplicity described this invention as though the locally produced carrier frequency generated by the local oscillator had a substantially unmodified frequency, it is desirable under certain circumstances to design the oscillator and the lock in thereto so that its output while modulated to a substantially less degree than that of the carrier is nevertheless somewhat modulated.

The relationships are indicated in Figure 7, the vector $\overline{O''PQ'}$ being shown as varying between the length $\overline{O''P}$ and $\overline{O''PQ'}$ being added to the vector $\overline{OA'}$ or $\overline{OB'}$ as before. I have found that by proper degree of coupling of the control circuit to the oscillator, together with proper oscillator design, the incoming control signal may be demodulated to any desired degree. That is, instead of completely demodulating the signal, it might be demodulated to 15%. Then, if the local oscillator input to the detector in combination with the incoming signal is made to be effectively 5%, the addition of the remaining 15% makes a total of 20% effective modulation. This would be no different than increasing the signal input four times, except that the demodulation in the case of an oscillator is not uniform with respect to modulation frequency. That is, the 30 cycle modulation might only be reduced to 20%, the 100 cycle modulation be reduced to 10% and the 1000 cycle modulation reduced to 1%, a negligible amount. This adds more to the low frequency end and so often improves the fidelity.

It will thus be seen that the utilization of the principles of this invention results in the following improvements in radio reception over reception as previously carried out:

1. Reduction of distortion when transmitters modulate over 100%. It is not only possible to eliminate most of the present overmodulation distortion, but it is now practical for average modulations to be doubled or tripled or more, thus increasing service areas and modulation detail. The value of broadcasting services will be multiplied about in direct ratio to the increase in modulation percentage.

2. Reduction of frequency fading distortion. Selective carrier fading which distorts all distant stations, and is particularly bad in the region where the "sky wave" and "ground wave" interfere, is very greatly reduced by my detector system which permits proper reproduction of this effective overmodulation.

3. Detector discrimination against unwanted stations. A peculiar characteristic of most detectors (as most detectors approach linearity with high input) is their discrimination against weak stations. The addition of the locally generated voltage as indicated above increases the carrier strength of the desired station and improves the apparent selectivity. Improvement as high as 50 to 1 has been measured, and greater values are theoretically possible. This is a very desirable feature of my detector system.

4. Reduction of linear detector distortion. With two equal symmetrical side bands on either side of a carrier frequency a linear detector does not distort (below a theoretical limit of 100% modulation). If the side bands are unequal, a common occurrence due to phase and amplitude changes in the R. F. and I. F. selective circuits ahead of the detector, distortion occurs, increasing with percentage of modulation. With my detection system as here outlined, the effective percentage of modulation may be reduced many times, with a corresponding reduction in distortion.

5. Reduction in square law detector distortion. The square law detector is the converse of the linear type. The square law detector does not distort with a single side band, but does distort with both side bands present. This distortion increases with percentage of modulation and so is improved by use of my detection system.

6. Increased sensitivity. The local source of energy adds to the incoming energy and improves the apparent sensitivity. In a strictly linear detector, with response being proportional to the first power of the carrier amplitude and percentage of modulation, this would not be true, as the percentage of modulation decreases directly as the carrier increases. In practice, however, it is found that this added local carrier enables a better operating characteristic to be utilized and so increases sensitivity.

7. Reduction of frequency modulation distortion. If due to non-symmetry in the amplifying stages (a usual condition), one side band is amplified more than the other, the vector sum of the side bands will not be in the same direction as the carrier. This shifts the phase of the sum of all three components from the direction of the normal carrier and gives rise to frequency modulation. This frequency modulation produces distortion in either a square law or linear detector. This distortion decreases as the percentage of modulation decreases, due to the addition of the local carrier.

8. Quiet set operation between stations. While perhaps not a direct result of the fundamental principles of this detector system, the circuits set up for practical operation are so arranged that stations will be received only when tuned (or very nearly) exactly correct. Between these correct tuning points no response of any kind (i. e., distorted signals, static, etc.) is obtained.

Furthermore, it is to be understood that the particular form of apparatus shown and described and the particular procedure set forth, are presented for purposes of explanation and illustration and that various modifications of said apparatus and procedure can be made without departing from my invention as defined in the appended claims.

What I claim is:

1. The method of receiving a signal modulated energy carrier which consists in combining therewith a local energy carrier, detecting the combined carrier energies to obtain the modulating signal, transmitting said modulating signal over an extended band of modulation frequencies, and preventing transmission of the modulating signal when the frequency of the incoming modulated energy carrier differs from that of the local energy carrier by an amount corresponding to beat frequencies included within the said extended transmission band of modulation frequencies.

2. In a tunable radio receiver, the combination with a detector and a network for the transmission of detected modulation frequencies over an extended band of frequencies, means for amplifying an incoming signal modulated carrier, and means including an oscillator for reducing the degree of modulation of the amplified signal modulated carrier, of means blocking operation of the receiver upon tuning towards an incoming carrier until the receiver is tuned to a frequency differing from that of the incoming modulated carrier by less than the width of the band of modulation frequencies transmitted by said network.

3. In a tunable radio receiver of the superheterodyne type, means for converting an incoming modulated carrier to an intermediate frequency signal, means including an oscillator tuned to said intermediate frequency for locally producing oscillations of the intermediate frequency, a detector and means for impressing on the same both the intermediate frequency signal and the oscillations of intermediate frequency, an output circuit coupled to said detector for the transmission of modulation signal frequencies, and means preventing transmission through said output circuit as the receiver is tuned towards an incoming modulated carrier until the receiver is tuned to a frequency differing from the frequency of the incoming modulated carrier by a relatively small number of cycles.

4. In a radio receiver, means tunable over a band of carrier frequencies to select an incoming modulated carrier of desired frequency, means including an oscillator producing a carrier energy output of the desired frequency for compensating selective fading of the desired incoming carrier, and means for effectively restraining the action of the compensating means as the receiver is tuned towards the desired incoming carrier until the receiver is tuned to a frequency differing from that of the desired incoming carrier by a relatively small number of cycles.

5. In a tunable radio receiver of the superheterodyne type, means for converting an incoming modulated carrier to an intermediate frequency signal, means for detecting the intermediate frequency signal and reproducing the signal modulation of the incoming modulated carrier, means including an oscillator tuned to said intermediate frequency for compensating selective fading of said incoming modulated carrier, and means for effectively restraining the action of said detecting and reproducing means as the receiver is tuned towards an incoming modulated carrier until the receiver is tuned to a frequency differing from the frequency of said incoming carrier by a relatively small number of cycles.

6. The invention as claimed in claim 5, wherein said restraining means comprises means for rendering said oscillator inoperative.

7. In a tunable radio receiver, the combination with tunable means for amplifying an incoming modulated carrier, a detector, and means biasing said detector to cutoff to prevent detection of the amplified modulated carrier, of a local oscillator for impressing upon said detector an oscillatory voltage of a magnitude rendering said biasing means ineffective, and means for effectively restraining operation of said oscillator as the receiver is tuned towards an incoming modulated carrier until the receiver is tuned to a frequency differing from the frequency of said incoming carrier by a relatively small number of cycles.

8. In the operation of a tunable radio receiver the process of preventing distortion in the reception of an energy carrier modulated more than 100% which consists in adding to the signal carrier a local energy carrier of a magnitude sufficient to reduce the effective percentage of modulation below 100%, tuning the receiver to effect a lock-in of the frequencies of the carriers, detecting the combined carrier energies to obtain the modulating signal, transmitting the modulating signal over an extended band of modulating frequencies, and controlling receiver operation in accordance with the accuracy of tuning to prevent transmission of the modulating signal whenever the frequency of the incoming modulated energy carrier differs from that of the local energy carrier.

9. An amplifier tube having an output circuit coupled to the input circuit of a succeeding tube, and an oscillator tube having a resonant circuit coupled to both said output circuit and said input circuit, said output circuit and also said input circuit and said oscillator circuit being tuned to substantially the same resonance frequency and the degree of coupling to said oscillator forcing locked-in oscillation thereof at a frequency near that of the resonance circuits when controlled by a signal energy carrier with a frequency near that of the resonance circuits.

10. In a system including an oscillator, means for controlling the frequency of said oscillator, said means comprising a variable frequency source of signal energy carrier coupled to said oscillator, said coupling being so proportioned as to control the oscillator over a desired range of controlled frequency, and means restricting the range of operation of said oscillator to a frequency range less than and entirely within the said desired range of controlled frequency.

11. In a detecting system, means for transmitting a modulated signal energy carrier, a source of substantially unmodulated energy carrier having the same frequency as said modulated energy carrier, both of said carriers being simultaneously impressed on a detecting device, and means for maintaining the ratio between the amplitudes of the unmodulated carrier and the modulated carrier substantially constant and not less than five to one.

12. In a detecting system, means for transmitting a modulated signal energy carrier, a source of substantially unmodulated energy carrier having the same frequency as said modulated energy carrier, both of said carriers being simultaneously impressed on a detecting device, means for maintaining the ratio between the amplitudes of the unmodulated carrier and modulated carrier substantially constant and not less than twenty to one.

13. In the operation of a detecting system, the method which comprises the simultaneous application of a modulated energy carrier and an unmodulated energy carrier of the same frequency to a detecting action, the said carriers being applied in opposition with the unmodulated energy carrier of a magnitude producing less than 100% modulation of the combined carrier energies.

14. In the operation of a radio receiver of the type including a local oscillator for producing an alternating voltage to be added to modulated radio frequency waves, the method which comprises locking the local oscillator in step with the modulated radio frequency waves over a relatively wide range of frequency difference between the tuning of the local oscillator and the frequency of modulated waves, combining the modulated waves and the output of the local oscillator, demodulating the combined oscillator output and modulated waves, reproducing the signal resulting from such demodulation, and blocking the signal reproduction when the said frequency difference exceeds a predetermined value substantially less than the limits of the said frequency difference range over which the oscillator is pulled into step with the modulated wave.

15. The method of operating a radio receiver as set forth in claim 14, wherein the blocking of signal reproduction is effected by preventing demodulation.

16. The method of operating a radio receiver as set forth in claim 14, wherein the blocking of signal reproduction is effected by preventing transmission of the signal resulting from said demodulation.

17. The method of operating a radio receiver as set forth in claim 14, wherein the blocking of signal reproduction is effected by rendering the local oscillator inoperative.

18. A radio receiver comprising means tunable over a carrier frequency band to select a desired modulated radio frequency signal, a local oscillator for supplying energy to the signal to reduce the percentage of modulation, means for locking said oscillator in step with the radio frequency signal over a range of frequency difference between the tuning of the oscillator and the frequency of the radio frequency signal, means for demodulating the signal of reduced percentage of modulation, means for transmitting the demodulated signal, means for reproducing the demodulated signal, and means responsive to the frequency difference between the oscillator tuning and the frequency of the radio frequency signal for blocking reproduction when said frequency difference exceeds a value substantially less than the limits of range within which the oscillator is pulled into step with the radio frequency signal.

19. A radio receiver as claimed is claim 18, wherein said blocking means comprises means rendering said demodulating means inoperative.

20. A radio receiver as claimed in claim 18, wherein said blocking means comprises means rendering said transmitting means inoperative.

21. A radio receiver as claimed in claim 18, wherein said blocking means comprises means rendering said oscillator inoperative.

22. A radio receiver as claimed in claim 18, wherein said means for locking said oscillator in step comprises coupling means for introducing into the oscillator modulated radio frequency energy from such signal of less than a magnitude which results in modulation of the oscillator output.

23. A radio receiver including a resonant circuit for transmitting modulated radio frequency energy, an oscillator having a resonant circuit for determining the normal frequency of the oscillator output, means for locking the oscillator into step with the radio frequency energy over a range of frequency difference between the oscillator tuning and the frequency of the radio frequency energy, means for combining the oscillator output and the radio frequency energy, means for demodulating the wave form resulting from such combination, means for reproducing the demodulated signal over a wide range of audio frequencies, and means controlled by the frequency difference between the oscillator tuning and the radio frequency energy for blocking reproduction when the frequency difference exceeds a value less than the frequency range of reproduction.

24. In a tunable radio receiver of the superheterodyne type, means for converting an incoming modulated carrier to an intermediate frequency signal, means including an oscillator tuned to said intermediate frequency for compensating selective fading of said incoming modulated carrier and means for effectively restraining the action of the compensating means as the receiver is tuned towards an incoming signal until the receiver is tuned to a frequency differing from the frequency of said signal by a relatively small number of cycles.

25. In the operation of a tunable radio receiver having a local oscillator for locking-in with an incoming signal modulated energy carrier over a band of frequencies, means for combining the incoming energy carrier with the energy carrier developed by the local oscillator, and means for tuning the receiver to establish an approximate identity of the frequencies of the local oscillator and the incoming energy carrier; the method of precluding a distorted reproduction of the modulating signal which comprises restricting reproduction of the modulating signal to an accuracy of tuning of the receiver at which the phase shift between the energy carrier of the local oscillator and the modulated energy carrier is less than the maximum value of 90° which determines the limits of the lock-in band.

26. In the operation of a tunable radio receiver of the type including a circuit traversed by an incoming signal modulated energy carrier, a local oscillator for producing an energy carrier for combination with the incoming signal modulated energy carrier, the oscillator including means for determining its normal oscillating frequency and a coupling to said circuit for locking-in the local oscillator with the incoming energy carrier as the frequencies of the local oscillations and the incoming energy carrier approach each other, means for tuning the receiver to an incoming energy carrier of a desired frequency, and means for reproducing the incoming modulating signal over an extended range of modulation frequencies; the method of preventing reproduction of beat frequencies which arise during tuning from a frequency difference between said energy carriers and which fall within the reproduction range of the receiver which comprises controlling receiver reproduction in accordance with the accuracy of tuning and preventing reproduction of modulating signals for all adjustments of the receiver tuning means which result in a difference between the frequencies of the incoming and the locally produced energy carriers.

27. In the process of receiving a signal modulated energy carrier by combining therewith a locally produced energy carrier of the same frequency to obtain a low percentage modulation of the combined energy carriers, detecting the combined energy carriers to obtain the modulating signal, and reproducing the modulating signal; the method of avoiding the reproduction of beat frequencies that may arise during adjustment of the frequency of one energy carrier towards the frequency of the other energy carrier to obtain a lock-in of the said frequencies, said method comprising controlling receiver reproduction in accordance with the accuracy of said frequency adjustments and preventing any reproduction of the modulating signal until the said frequencies are exactly identical.

28. In a radio receiver, the combination with a local oscillator for locking-in with an incoming signal modulated energy carrier to produce an energy carrier for combination with the modulated energy carrier, a detector for detecting the combined energy carriers, and means for tuning the receiver to bring the frequencies of the incoming and locally generated energy carriers within a lock-in band, whereby the said frequencies will be identical when the tuning accuracy results in a lock-in condition of said local oscillator, of means preventing reproduction of the modulating signal when the tuning accuracy is outside the range of lock-in operation of the local oscillator.

29. In a radio receiver, the combination with a local oscillator for locking-in with an incoming signal modulated energy carrier to produce an energy carrier for combination with the modulated energy carrier, a detector for detecting the combined energy carriers, and means for tuning the receiver to bring the frequencies of the incoming and locally generated energy carriers within a lock-in band, whereby the said frequencies will be identical when the tuning accuracy results in a lock-in condition of said local oscillator, of means preventing reproduction of the modulating signal when the error in tuning is less than that corresponding to the limits of the lock-in band but results in a substantial phase difference between the locally produced and the incoming energy carriers.

30. In the operation of a tunable radio receiver having a local oscillator adapted to lock-in with an incoming signal modulated energy carrier to provide an energy carrier for combining with the incoming energy carrier, the method which comprises restricting the lock-in range of oscillator operation to less than the band width of the modulating signal to be reproduced, and preventing reproduction of the modulating signal when said local oscillator operates adjacent the limits of the lock-in band.

31. In a radio receiver, the combination with a signal carrier amplifier, and a detector, of an oscillator, coupling between said oscillator and said amplifier to lock in said oscillator at signal carrier frequencies in a predetermined frequency band approximating the normal oscillator frequency, and means restricting transmission by said detector to signal carriers of frequencies within a narrow frequency band of less extent than said predetermined lock-in frequency band.

32. A detecting element, input circuit means for impressing an incoming signal energy carrier and a local energy carrier on said detecting element, means responsive to a frequency difference between said energy carriers for producing a control potential, and means responsive to a produced control potential to render said detecting element inoperative.

33. The combination with a tunable signal amplifier system; of an oscillator including a vacuum tube having a cathode, a control grid and a virtual anode grid constituting oscillation control elements, an output plate electrode, a shield grid interposed between said output plate electrode and said oscillation control elements; means coupling said oscillation control elements to said signal amplifier system to control the frequency of the generated oscillation; and an output circuit connected between the cathode and the output plate electrode.

34. The invention as claimed in claim 33, in combination with means coupling said output circuit to said signal amplifier system at a point thereof beyond the coupling means which determines the frequency of the oscillator output.

35. In an oscillation system, the combination with an oscillator including a generator and a tuned circuit determining the normal oscillatory frequency of the generator, of a frequency-control circuit coupled to said oscillator to lock in said oscillator over a range of frequencies, and means limiting the operation of said oscillator to a range of frequencies within and of less extent than said lock-in range.

36. A radio receiver comprising in combination a signal transmitting and amplifying system including a detector having a control system, and means for biasing the control system of said detector to cut off by a bias potential larger than the peak potential of the signal received by the detector, means for locally generating an alternating potential of the same frequency as the carrier frequency of the received signal, and means for impressing said local alternating potential on the control system of said detector in addition to the received signal, thereby to overcome said biasing means to render said detector operative.

KENNETH W. JARVIS.